United States Patent [19]

Archibald et al.

[11] Patent Number: 4,904,890

[45] Date of Patent: Feb. 27, 1990

[54] BORE PACK EXCITER COOLING SYSTEM

[75] Inventors: James B. Archibald, Schenectady; Ernest L. Moore, Ballston Lake; Richard N. Dawson, Voorheesville; Kenneth G. Herd, Schenectady, all of N.Y.

[73] Assignee: General Electric Company, Schenectady, N.Y.

[21] Appl. No.: 292,979

[22] Filed: Jan. 3, 1989

[51] Int. Cl.[4] .................. H02K 9/06; H02P 11/06
[52] U.S. Cl. .............................. 310/59; 310/63; 310/89; 415/178.4
[58] Field of Search .............. 310/55, 58, 59, 60 R, 310/62, 63, 64, 89, 90, 112, 68 D; 415/173.4, 174.4; 417/423.2

[56] References Cited

U.S. PATENT DOCUMENTS

| 3,529,905 | 9/1970 | Meginnis | 415/173.4 |
| 3,846,899 | 11/1974 | Gross | 415/174.4 |
| 4,682,068 | 7/1987 | Cotzas et al. | 310/64 |
| 4,745,315 | 5/1988 | Terry, Jr. et al. | 310/61 |
| 4,814,653 | 3/1989 | Hasegawa et al. | 384/476 |

Primary Examiner—Patrick R. Salce
Assistant Examiner—D. Rebsch
Attorney, Agent, or Firm—Jerome C. Squillaro

[57] ABSTRACT

A gas cooling system for a bore pack exciter for a power generator in which high velocity, colder cooling gas is obtained from the region within the generator where the entering cooling gas is impelled by the generator fan, and means to direct part of that cooling gas from that flow through the bore pack exciter before return to the interior of the generator for recycling through the cooling unit.

15 Claims, 2 Drawing Sheets

BORE PACK EXCITER COOLING SYSTEM

BACKGROUND OF THE INVENTION

This invention was made with Government support under a contract with the U.S. Navy. The Government has certain rights in this invention.

Bore pack exciter systems are used to rectify alternating current (Ac) and provide direct current (Dc) field excitation power for an electric power generator. The bore pack exciter is commonly mounted on the end of the generator. However, the high power bore pack exciter requires internal cooling to prevent overheating; and down time, not only of the exciter but also the power generator to which it supplies Dc field power. Power generating systems normally include a cooling system having a cooler to provide cooling air into the interior of the housing or frame of the power generator to be blown over the components within the power generator housing by fan blades attached to the rotating shaft of the generator. The fan forces the cooled air to flow along and around the heated parts of the generator, such as the coils, rings and laminations. Arrangements presently in use cause part of the cooling air which has flowed through the electric power generator to be directed to pass through the bore pack exciter, after which it is returned to the cooler for re-cooling and return to the power generator. However, the temperature of this cooling air has been elevated and its velocity reduced in passing through the generator, such that it does not provide efficient or effective cooling of the bore pack exciter. Also, for certain demanding applications, where size and weight of the power generation system may be limited, it becomes necessary to obtain increased bore pack exciter cooling over that provided by existing systems. The use of an additional cooler and/or fan to accomplish such increased cooling would add size and weight and would increase the cost of the power generation system.

OBJECTS AND SUMMARY OF INVENTION

It is an object of the present invention to provide an improved cooling system for a bore pack exciter in a power generation system.

It is a further object of the present invention to provide an improved cooling system for a bore pack exciter in a power generation system without additional coolers or fans.

It is a still further object of the present invention to provide an improved simplified cooling system for a bore pack exciter in a power generation system which does not add size or weight to the system.

In carrying out the above and other objects of the present invention, there is provided a gas cooling system for a bore pack direct current exciter in an electric power generation system in which a cooling unit provides cooling gas to the interior of the generator to be blown through the interior of the generator by a fan attached to the rotor of the generator and means to direct the flow of gas at the highest velocity, coldest temperature from the generator region adjacent to the fan blades to flow into the end of the bore pack exciter, through the exciter and back through the generator to be recycled through the cooling unit for return to the power generator.

BRIEF DESCRIPTION OF DRAWINGS

Referring to FIG. 1, there is shown an electric power generator 1 having a housing 2 including rotor 3 rotatably supported within by bearings 4 and 5 at the end plates 6 and 7 respectively. The power generator is driven through coupling 11 by a prime mover such as a steam or gas turbine (not shown). A bore pack exciter 12 is secured to end plate 7 to supply direct current (Dc) power to the field windings of electric power generator 1. The bore pack exciter 12 includes power diodes (not shown) to convert ac),. Secured to the top of electric power generator 1 is a cooler assembly 14 and 15 which extracts heat from the gas flowing within the generator. A fan hub 17 is secured around the end of rotor 3 within the housing 2 adjacent to end plate 7 and bore pack exciter 12. Secured around the periphery of the fan hub remote from the rotor 3 are a plurality of fan blades two of which are shown by 18 and 19 such that the fan blades 18 and 19 rotate with the rotor to blow cooling gas, whether hydrogen or air, between and over the rotor 3 and the stator windings, the end portion of which is shown by end winding 20. The serrations or saw teeth 32 on inner shield 26 adjacent to the fan blade 19 create a tortuous path for any leakage flow which may occur therebetween to minimize such leakage. Also, if there is any rubbing or contact between the fan blade 19 and inner shield 26 due to misalignment or other reasons, the rubbing and wear will be limited to the point area of the serrations 32.

Figure 2:
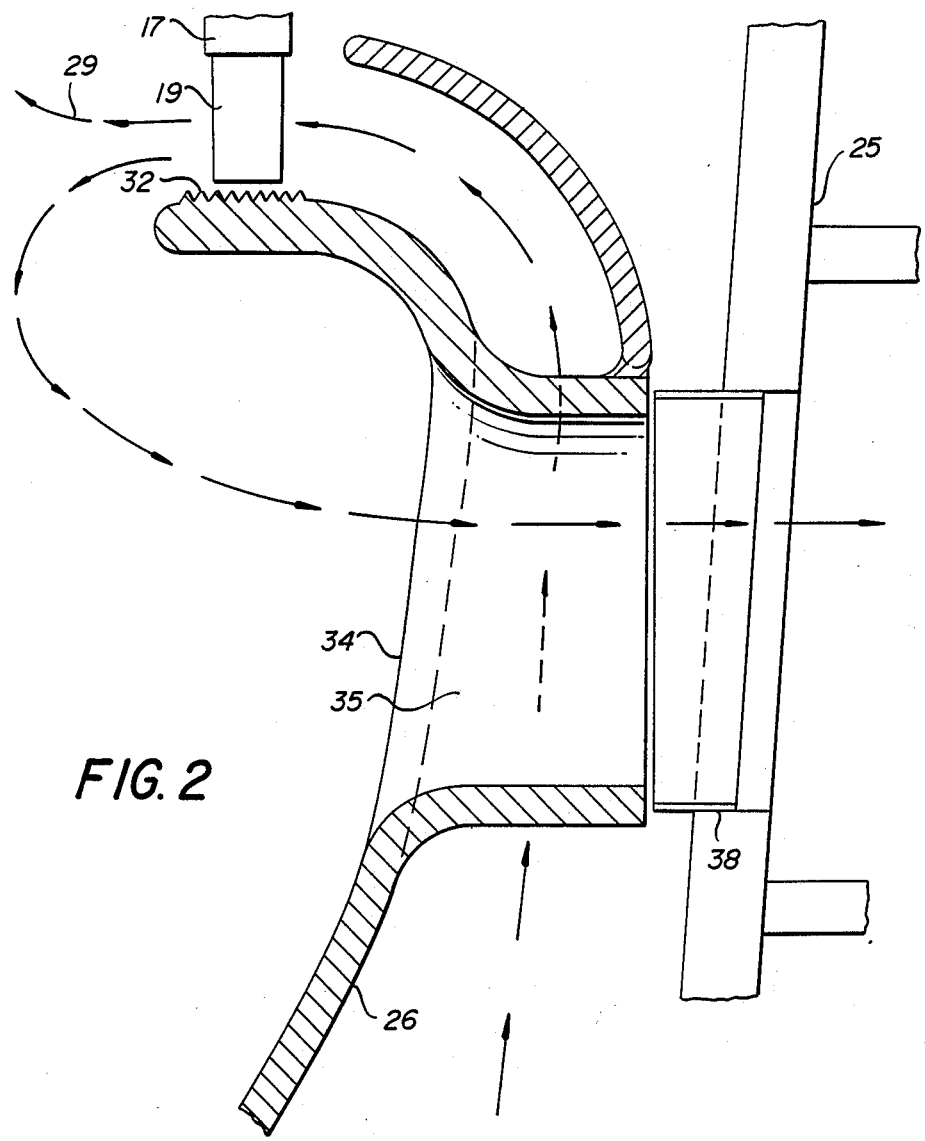
FIG. 2 is an enlarged portion of FIG. 1 useful in describing the present invention.

Cooling or cold gas 23 is delivered by cooler 14 and 15 to the end region of generator 1 adjacent to fan blades such as 18 and 19 (when rotated to the position shown for 18) through a passageway 24 formed between outer shield 25 and inner shield 26, shown in more detail in FIG. 2, to enter generator 1 where it is blown by fan blades 18, 19 over and between the rotor 3, stator core and stator bars (not shown), connection rings (not shown) and other members within the generator 1 such as end winding 20 to cool the interior of the generator and the components within the generator. The cooling gas 23 removes heat from the interior of generator 1 and flows back to the cooler assembly 14, 15 through return path 29 where it is cooled by the cooler assembly and then recycled back through the generator. The cooling gas 23 is not only propelled through the electric power generator 1 by the fan blades 18, 19 but also by the pressure built up within the housing 2 because of the rotation of the fan blades.

However, it is also necessary to cool the bore pack exciter 12. It has been proposed and/or is known to provide a separate cooling system for the bore pack exciter 12, or alternatively to pass the cooling gas flow from the generator through the bore pack exciter before returning it to the cooler assembly. An additional cooler assembly and associated fan adds cost, complexity and weight to the power generator system. Passing cooling gas from the generator through the bore pack exciter before returning it to the cooler assembly is not too effective, since the cooling gas has increased in temperature and decreased in velocity by the time it reaches the bore pack exciter.

Figure 1:
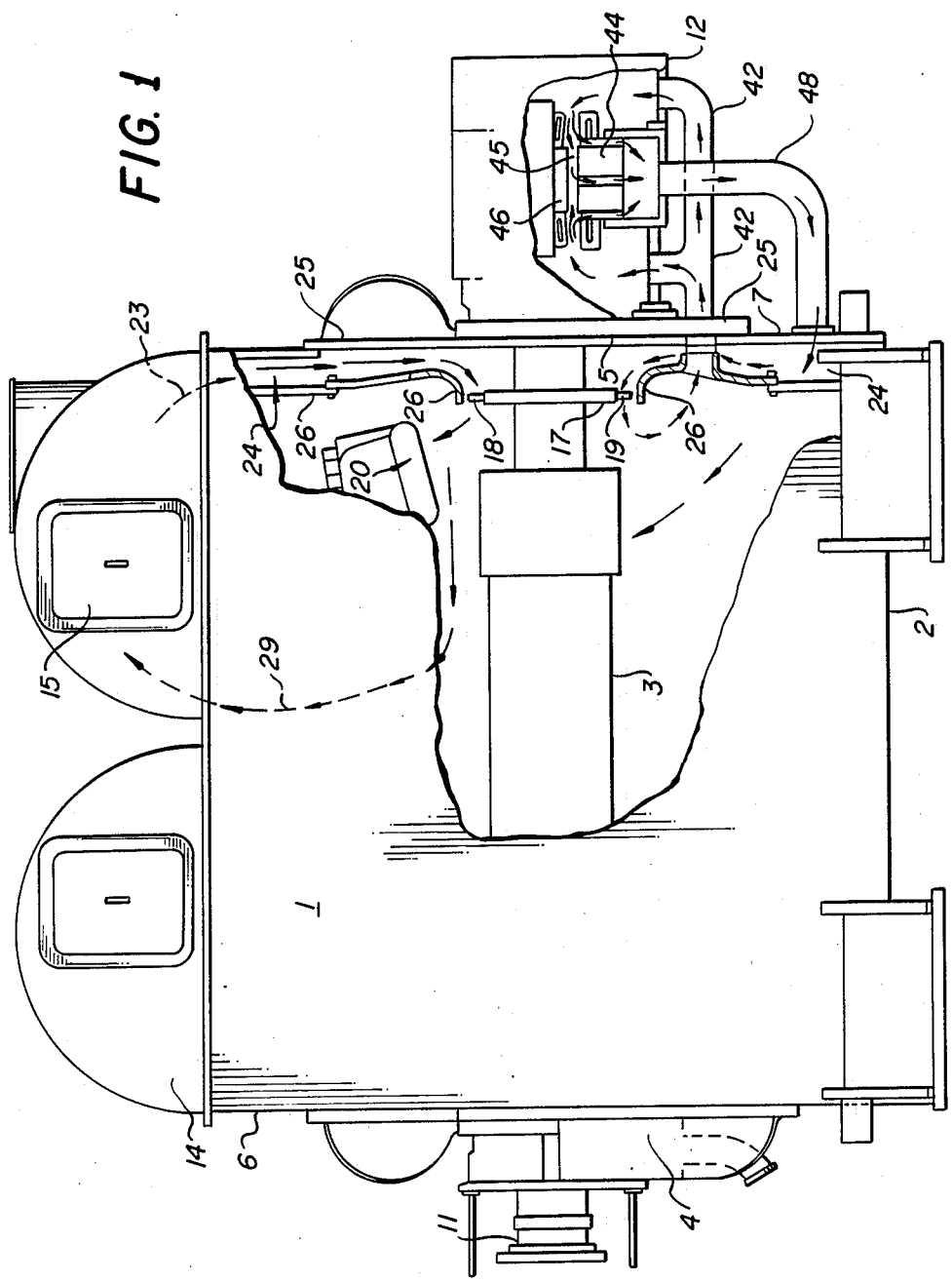
FIG. 1 is a drawing of a generator system embodying the present invention shown partially cut away to better illustrate the invention.

In accordance with the present invention, means are provided to utilize the cooler assembly 14, 15 to also provide cooling gas 23 to the bore pack exciter 12 as shown in FIGS. 1 and 2. Referring to FIGS. 1 and 2, there is provided a port 34 adjacent to the outer periphery of fan blades 18, 19 and a conduit or passageway 35 through the inner shield 26. The passageway 35 is generally oval in cross section having a larger diameter of approximately 19 inches and extends approximately 5 inches through inner shield 26. A circular opening 38 in outer shield 25 receives adjustable sleeve 40 welded in position in opening 38 and interposed between the outer sleeve 25 and inner sleeve 26 to connect the port 34 to the interior of the bore pack exciter 12 through inlet duct 42. As indicated by the arrows in FIG. 2, the cooling gas 23 flow is through the inlet duct 42, around both ends of stator member 44, and through air gaps such as 45 between members 44 and core member 46. The cooling gas 23 then exits through outlet duct 48 to the generator passageway 24 where it is passed through the generator 1 to the gas return path 29 for recycling through the cooler assembly 14, 15.

It is to be noted that the cooling gas 23 provided to the bore pack exciter 12 is taken from the interior of the generator 1 in the region where the cooling gas 23 first enters the generator from the cooler assembly 14, 15. It is in this region, before heat is absorbed from the interior of generator 1 that the cooling gas 23 is the coldest. Moreover, since this region is immediately adjacent the fan blades 18, 19, the velocity of the cooling gas provided to the bore pack exciter 12 is at its highest, before the velocity is diminished by the flow of the cooling gas through the interior of the generator past the spinning rotor 3. Cooling gas at a high velocity provides better cooling than at lower velocities. Thus, the coldest, highest velocity, cooling gas is the most effective cooling medium, and the present invention provides efficient and optimum cooling.

While the present invention has been described with respect to certain preferred embodiments thereof, it is to be understood that numerous variations in the details of construction, the arrangement and combination of parts, and the type of material used may be made without departing from the spirit and scope of the invention.

What we claim is:

1. A gas cooling system for a bore pack exciter positioned adjacent to an electric generator to provide direct current power to the generator field comprising:
   a fan within said electric generator connected to one end of the shaft of said generator for rotation therewith;
   a cooling unit to extract heat from a cooling gas;
   means to provide said cooling gas to the interior of said power generator in an end region adjacent said fan;
   said fan imparting a maximum velocity to said cooling gas in said end region;
   a passageway to connect said maximum velocity cooling gas in said end region of said generator to the interior of said bore pack exciter;
   means within said bore pack exciter to direct the flow of said maximum velocity cooling gas fed by said fan and passing through said passageway to flow through the interior of said bore pack exciter to cool the interior thereof;
   means to return said cooling gas to the interior of said generator after passing through said bore pack exciter; and
   means to direct said returned cooling gas through and out of said generator;
   whereby said cooling gas is provided to said bore pack exciter from said end region of said generator by said fan at substantially the coolest temperature and highest velocity available within said generator.

2. A gas cooling system in accordance with claim 1 wherein the cooling gas is provided to the interior of said generator through a passageway formed between the end plate of said generator and an inner gas shield positioned contiguous thereto.

3. A gas cooling system in accordance with claim 2 wherein said cooling gas is delivered by said passageway to said fan in the interior of said generator.

4. A gas cooling system in accordance with claim 3 wherein said fan also delivers cooling gas to the interior of said generator to cool the interior thereof, before return of said cooling gas to said cooling unit to remove heat therefrom and subsequent return of said cooling gas to said end region of said power generator.

5. A gas cooling system in accordance with claim 4 wherein said inner gas shield includes a port through the face thereof for the passage of said cooling gas to said bore pack exciter, while a major portion of said cooling gas passes directly into the interior of said power generator for the cooling thereof.

6. A gas cooling system in accordance with claim 5 in which said cooling gas for said bore pack exciter passes through an adjustable sleeve fastened to, and providing a passage through, the outer shield of said generator and then to the interior of said bore pack generator.

7. A gas cooling system in accordance with claim 5 in which an inlet duct connects said port to the interior of the ends of said bore pack exciter to direct the flow of said cooling gas into said ends.

8. A gas cooling system in accordance with claim 7 in which an outlet duct connects the central region of said bore pack exciter to the interior of said generator in the region of said passageway to direct said cooling gas back through said generator to said cooling unit for the recycling thereof.

9. A gas cooling system in accordance with claim 8 in which said port is a substantially oval opening.

10. A gas cooling system in accordance with claim 9 in which said fan includes:
    a fan hub attached to said shaft for rotation therewith;
    a plurality of fan blades axially extending from said fan hub; and
    serrations on said gas shield adjacent to the ends of said fan blades remote from said fan hub.

11. A gas cooling system in accordance with claim 2 in which said inner gas shield includes a port through the face thereof for the passage of a portion of said cooling gas to said bore pack exciter, while a major portion of said cooling gas passes directly into the interior of said power generator for the cooling thereof.

12. A gas cooling system in accordance with claim 11 in which an inlet duct connects said port to the interior of the ends of said bore pack exciter to direct the flow of said cooling gas into said ends.

13. A gas cooling system in accordance with claim 12 in which an outlet duct connects the central region of said bore pack exciter to the interior of said generator in the region of said passageway to direct said cooling gas back through the interior of said generator for the recycling thereof.

14. A gas cooling system in accordance with claim 13 in which said fan includes:

a fan hub attached to said shaft for rotation therewith; and a plurality of fan blades axially extending from said fan hub.

15. A gas cooling system in accordance with claim 14 in which serrations are provided on said gas shield adjacent to the ends of said fan blades remote from said fan hub.

* * * * *